US012653344B2

(12) United States Patent     (10) Patent No.: US 12,653,344 B2
Yadai et al.     (45) Date of Patent: Jun. 16, 2026

(54) GRINDING APPLIANCE

(71) Applicant: A.D.M.T TRADING LTD, Rehovot (IL)

(72) Inventors: Meir Yadai, Nes-Ziona (IL); Uriel Tabib, Rosh-Haayin (IL); Ibrahim Nsasra, Beer Sheva (IL); Asaf Tabib, Tel Aviv (IL)

(73) Assignee: A.D.M.T TRADING LTD, Rehovot (IL)

( * ) Notice: Subject to any disclaimer, the term of this patent is extended or adjusted under 35 U.S.C. 154(b) by 789 days.

(21) Appl. No.: 18/009,607

(22) PCT Filed: Jun. 10, 2021

(86) PCT No.: PCT/IL2021/050705

§ 371 (c)(1),
(2) Date: Dec. 9, 2022

(87) PCT Pub. No.: WO2021/250676

PCT Pub. Date: Dec. 16, 2021

(65) Prior Publication Data

US 2023/0210307 A1    Jul. 6, 2023

(30) Foreign Application Priority Data

Jun. 10, 2020    (IL) .......................................... 275281

(51) Int. Cl.
*A47J 42/20*     (2006.01)
*A47J 42/16*     (2006.01)
(Continued)

(52) U.S. Cl.
CPC ............... *A47J 42/46* (2013.01); *A47J 42/16* (2013.01); *A47J 42/20* (2013.01); *A47J 42/40* (2013.01);
(Continued)

(58) Field of Classification Search
CPC .. A47J 42/46; A47J 42/16; A47J 42/20; A47J 42/40; A47J 42/50; A47J 42/38;
(Continued)

(56) References Cited

U.S. PATENT DOCUMENTS

| | | | |
|---|---|---|---|
| 721,651 A | 2/1903 | Struab | |
| 4,290,560 A * | 9/1981 | Tabah | A23N 15/00 241/246 |

(Continued)

FOREIGN PATENT DOCUMENTS

| | | |
|---|---|---|
| CN | 208356553 | 1/2019 |
| WO | WO 2018079092 | 5/2018 |

OTHER PUBLICATIONS

International Search Report and Written Opinion in International Application No. PCT/IL2021/050705, mailed on Oct. 12, 2021, 12 pages.

*Primary Examiner* — Tiffany T Tran

(74) *Attorney, Agent, or Firm* — Fish & Richardson P.C.

(57) ABSTRACT

The present disclosure discloses an appliance, suitable for home use, for grinding oil-containing hard produce, in particular oil-containing seeds, to therefore extract an oily substance product. For example, the appliance may grind sesame to obtain Tahini, or peanuts/almonds to obtain butter therefrom. The present disclosure further discloses a capsule to be received in a grinding appliance such as disclosed herein. The appliance incudes two grinding members, configured to grind the hard produce. Each grinding member has a grooved face that is patterned to be configured for grinding. The hard produce is grinded in the interface defined between the two grooved faces, defining a grinding zone. The grinding members typically have a shape of a circle and are aligned one with the other along a common axis. At least one of the grinding members is configured to rotate about the axis to perform the motion carrying out the grinding in the (Continued)

interface between the members. The hard produce is introduced into the grinding zone via one or more openings in at least one of the grinding members. The openings lead directly into the grinding zone, namely the hard produce that is fed through the openings reaches to a part of one of the grooved faces to initiate the grinding process. The grinding zone is constituted by two grinding portions, an inner grinding portion and a peripheral grinding portion, defining inner grinding zone and peripheral grinding zone, respectively. A peripheral collection zone is disposed peripheral to the peripheral grinding zone and is configured to collect the grinded oily substance product that radially flows from the peripheral grinding portions. The oily substance in the collection zone flows towards a substance collector, through which the oily substance flows for being collected.

20 Claims, 10 Drawing Sheets

(51) Int. Cl.

| | | |
|---|---|---|
| *A47J 42/40* | (2006.01) | |
| *A47J 42/46* | (2006.01) | |
| *A47J 42/50* | (2006.01) | |
| *B02C 7/08* | (2006.01) | |
| *B02C 7/12* | (2006.01) | |
| *A23L 25/00* | (2016.01) | |

(52) U.S. Cl.
CPC ................. *A47J 42/50* (2013.01); *B02C 7/08* (2013.01); *B02C 7/12* (2013.01); *A23L 25/00* (2016.08)

(58) Field of Classification Search
CPC . A47J 19/00; A47J 42/00; A47J 42/10; B02C 7/08; B02C 7/12; B02C 7/00; B02C 25/00; A23L 25/00; A23N 1/02; C11B 1/10; B24D 7/00
See application file for complete search history.

(56) References Cited

U.S. PATENT DOCUMENTS

| | | | | |
|---|---|---|---|---|
| 4,839,193 | A | 6/1989 | Mange et al. | |
| 2009/0084274 | A1* | 4/2009 | Kovacic | A47J 43/06 99/348 |
| 2011/0284670 | A1* | 11/2011 | Jenkins | B02C 7/188 241/6 |
| 2012/0297987 | A1* | 11/2012 | Lee | A47J 31/446 99/295 |
| 2017/0128949 | A1 | 5/2017 | Takai et al. | |

* cited by examiner

318

BOWL

450

461

458

460

456

454

462

GRINDING APPLIANCE

CROSS-REFERENCE TO RELATED APPLICATIONS

This application is a National Stage Application under 35 U.S.C. § 371 and claims the benefit of International Application No. PCT/1L2021/050705, filed Jun. 10, 2021, which claims priority to Israel Patent Application No. 275281, filed Jun. 10, 2020. The disclosure of the foregoing application is hereby incorporated by reference in its entirety.

TECHNOLOGICAL FIELD

The present disclosure is in the field of food accessories, in particular appliance for obtaining a food product from raw produce.

BACKGROUND

There is a growing demand for consumption of natural and non-industrial edible products. People desire to eat the most nutritious food that did not undergo any industrial process. Therefore, the requirements for preparation of food from raw products constantly growing.

GENERAL DESCRIPTION

The present disclosure discloses an appliance, suitable for home use, for grinding oil-containing hard produce, in particular oil-containing seeds, to therefore extract an oily substance product. For example, the appliance may grind sesame to obtain Tahini, or peanuts/almonds to obtain butter therefrom. The present disclosure further discloses a capsule to be received in a grinding appliance such as disclosed herein.

The appliance has relatively low dimensions to fit for household use or other non-industrial uses. The appliance incudes two grinding members, i.e. millstones, configured to grind the hard produce. Each grinding member has a grooved face that is patterned to be configured for grinding, the grooved face of each member faces the grooved face of the other member. The hard produce is grinded in the interface defined between the two grooved faces, defining a grinding zone. The grinding members typically have a shape of a circle and are aligned one with the other along a common axis. At least one of the grinding members is configured to rotate about the axis to perform the motion carrying out the grinding in the interface between the members. The hard produce is introduced into the grinding zone via one or more openings in at least one of the grinding members. The openings lead directly into the grinding zone, namely the hard produce that is fed through the openings reaches to a part of one of the grooved faces to initiate the grinding process. The grinding zone is constituted by two grinding portions, an inner grinding portion and a peripheral grinding portion, defining inner grinding zone and peripheral grinding zone, respectively. Each grinding portion has a different grooves pattern, typically the inner grinding portions has grooves that are less dense than the grooves in the peripheral grinding portions. The inner grinding portions is defined along a radial distance between the axis and the peripheral grinding portions, and the peripheral grinding portions is defined along a radial distance between the inner grinding portions and a peripheral collection zone. The peripheral collection zone is disposed peripheral to the peripheral grinding zone and is configured to collect the grinded oily substance product that radially flows from the peripheral grinding portions. The oily substance in the collection zone flows towards a substance collector, through which the oily substance flows for being collected.

A first aspect of the present disclosure provides an appliance for grinding oil-containing hard produce, e.g. sesame or peanuts, to extract an oily substance therefrom. The appliance includes first and second coaxial circular grinding members defining a grinding zone therebetween. The first member is rotatable about an axis with respect to the second member and is coupled to a driving unit for performing the rotation with about the axis. Each of the first and second members having a respective grooved face, namely a first grooved face of the first grinding member and a second grooved face on the second grinding member. The first and the second grooved faces are facing one another on two sides of said zone. Each of the grooved faces having an inner grooved portion and a peripheral grooved portion, defining, respectively, inner and peripheral grinding zones. The grooves on the inner grooved portion are configured to urge and guide the produce, either when it is in its intact form or in its grinded or partially grinded form, towards the peripheral grooved portion. The grooves of the peripheral portion have a different pattern than the grooves of the inner portion. The difference may be any of density, orientation, size, depth, etc.

One of the first and second grinding members is formed with one or more feeding openings, for being linked to a feeder, for feeding the produce into the inner grinding zone.

A collection zone that may be formed of a collection trough is disposed peripheral to the peripheral grinding zone for collecting the ground oily substance and channeling it to a substance collector through a collecting port formed at a portion of the collection zone.

In some embodiments, the collection zone and the collection trough are co-planar with the grinding zones. In other words, the collection zone and the grinding zones lie on the same plane and the ground oily substance flows radially on the plane until reaching the collection zone and from there flows through a collection opening.

In some embodiments, the grooves of the peripheral portion have a generally radial orientation.

In some embodiments, the appliance includes peripheral wall that are peripheral to the peripheral grinding zone. The collection zone is defined between the peripheral grinding zone and the peripheral wall, namely the ground oily substance flows in the interface between the peripheral wall and the peripheral grinding zone.

In some embodiments of the appliance, the peripheral wall is circular and has a varying diameter along the axis direction between first and second diameters. The first diameter is selected to define a space from one of the grinding members thereby forming the collection zone, the second diameter is larger than the first diameter. The first diameter is selected to fit the size of the bottom grinding member, which is typically the grinding member that is not formed with the feeding opening, such that when the bottom grinding member is set in position, there is a minimal gap between its periphery and the periphery wall. This ensures that the oily substance flows with the rotation of the rotating grinding member at a generally tangential direction and does not flow downwardly.

In some embodiments, the appliance includes a base body configured to receive and retain the bottom grinding member of the two grinding members. In some embodiments, the base body includes the peripheral wall.

In some embodiments of the appliance, each of the inner grooved portions of first and second members is formed of a plurality of inner grooved sections. Each grooved section is constituted by parallel grooves having varying lengths.

In some embodiments of the appliance, the grooves of the peripheral portion are denser than the grooves of the inner portion. Namely, the repetition of a peak and an adjacent nadir of peripheral grooves is shorter than the same cycle of parallel grooves of the inner grooved sections.

In some embodiments of the appliance, the grooves of the inner portion and/or the grooves of the peripheral portion are having generally smooth and/or rounded outline, i.e. having no sharp edges to avoid oily substance to stick in these edges, therefore easing the cleaning of the grinding members and in particular the grinding portions thereof. These round edges define the fillet portion of each groove, namely the radius of the circle that the edge is being part of. The fillet portion has a diameter that at least at the magnitude of the dimension of the groove, namely the distance between the lowest portion and the highest portion of each groove. At times, the fillet portion is larger than said magnitude. In other words, grooves of a single portion are typically characterized by a periodic pattern of peaks and lows along a certain horizontal direction. The distance between each two adjacent peaks or each two adjacent lows may vary along said horizontal direction. However, the distance between two adjacent peaks or lows is, in some embodiments, greater than the vertical distance between adjacent low and peak along a vertical direction. The vertical direction is normal to the horizontal direction.

In some embodiments of the appliance, each of the first and second grinding members is removable and separable from the axis and in practice from the entire appliance. This allows, for example, to remove the grinding members to clean it outside the appliance or put in a dishwasher for cleaning. Furthermore, there can be more than one pair of grinding members that fit in the appliance, each grinding pair may be configured to grind a different type of produce. For example, a first grinding pair may be configured to grind sesame and a second pair may be configured to grind peanuts.

In some embodiments, the space between the two grinding members is radial dependent, namely it varies along the radial direction. For example, the space between the grinding members at the proximity of the axis may be the largest and it decreases with the distance from the axis such that it reaches the smallest space at the peripheral grinding zone. This may result in a gradual grinding of the produce as it move along the radial direction.

In some embodiments, the appliance includes an axle formed along the axis and coupled to a driving motor for being rotated thereby. The first grinding member is coupled to the axle for being rotated thereby upon operation of the motor.

In some embodiments, the appliance includes a screwing stopper element removably couplable to the axle, typically at a top end thereof, for retaining the first and/or second grinding members on said axle upon being coupled to the axle. While the screwing stopper is removed, the removal of the first and/or second grinding members is allowed.

In some embodiments of the appliance, the grinding member that is not form with the feeding opening, namely the bottom grinding member, is formed with depressions at its non-grooved face that fit to receiving abutments that are formed at a base body of the appliance. By placing the depressions over the abutments, the grinding member is secured to the body of the appliance. When the bottom grinding member is received in the abutments, the interface between the bottom grinding member and the peripheral wall defines the collection zone, such that the oily substance flows in particular on a top face of the bottom grinding member and portion of it flows in the gap between the bottom grinding member and the peripheral wall. The oily-substance that is extracted from the produce flows towards the collection zone and the rotation of the top grinding member causes it to flow at a tangential direction until it reaches the collecting port and flows therethrough.

In some embodiments of the appliance, one or more feeding opening is formed at a selected radial distance from the axis. Namely the opening is formed at a certain distance from the axis and not on the axis itself or its proximity.

In some embodiments of the appliance, the radial distance of the feeding opening is closer to the periphery edge of the first and/or second grinding members than to the axis. This allows agitation of the hard produce in the feeder that is linked to the opening, e.g. a capsule, for facilitating the desired flow of the produce towards the inner grinding zone.

In some embodiments, the appliance further includes a capsule receptacle that is configured for receiving a capsule containing said oil-containing hard produce so as to allow the content of the hard produce from the capsule to be to at least one of said one or more feeding openings, upon receiving a capsule in the capsule receptacle.

In some embodiments, the capsule receptacle is configured for rupturing a sealing foil of the capsule upon manipulation of the capsule when it is received in the capsule receptacle, e.g. by rotating the capsule at a certain degree for engaging between element in the capsule receptacle and the sealing foil, for allowing the content of the capsule to flow through said one or more feeding openings.

In some embodiments of the appliance, the capsule receptacle includes a rupturing element, e.g. a blade for rupturing a sealing foil of the capsule for allowing the content of the capsule to flow through said one or more feeding openings.

In some embodiments of the appliance, the capsule receptacle is rotatable around the axis together with the first grinding member. Upon the rotation of the first grinding member, the capsule receptacle remains in a fixed association with at least one of the feeding openings.

In some embodiments of the appliance, the capsule receptacle is coupled to an axle formed along the axis. The axle is further coupled to a driving motor for being rotated thereby and the first grinding member is coupled to the axle for being rotated therewith.

In some embodiments of the appliance, the screwing stopper element is further configured for retaining the capsule receptacle on the axle. Thus, the screwing stopper element fits over the top of the axle and along the axle, from top to bottom, arranged the linking portion of the capsule receptacle, i.e. the portion that is fit over the axle, the first grinding member and at the bottom the second grinding member.

In some embodiments of the appliance, the capsule receptacle has a portion that fits over at least one of the one or more feeding openings.

In some embodiments, the appliance further includes an activation unit configured for allowing the rotation of the first member upon manipulation thereon. Namely, the activation unit is configured for allowing the driving unit to rotate the first member upon activation thereof, e.g. by a closure of a top cover that is configured to cover the capsule when it is received in the capsule receptacle.

In some embodiments of the appliance, the capsule receptacle includes an activation unit configured for allowing the rotation of the first member upon manipulation thereon.

In some embodiments of the appliance, the activation unit is switchable between active mode that allows the rotation of the first member, namely operation of the driving motor that rotates the first member, and non-active mode that blocks the rotation of the first member. The activation unit is configured to be switched between non-active mode to active mode upon manipulation thereon that can be triggered by either insertion of the capsule or closure of a top cover of the appliance that covers and encloses the received capsule.

In some embodiments of the appliance, the grinding member that is formed with the one or more feeding openings, e.g. the first grinding member, is further formed with peripheral upwardly rising walls, which may be vertical or inclined. The walls rise from a second face, different than the grooved face, to thereby form a container volume for receiving the hard produce. The surface of the container volume includes the feeding opening such that hard produce that is contained within the container volume can flow into the feeding opening from the surface, e.g. by rotational forces during the rotation of the first grinding member.

In some embodiments of the appliance, the collection zone includes a collection opening for allowing the extracted oily substance to be discharged to a container through the substance collector.

In some embodiments of the appliance, the collection zone is formed with flow diverting elements for directing the flow of the oily substance in the collection zone to the collection opening. The diverting elements may be formed by blades protruding from the peripheral wall such that they interrupt the flow of the oily substance in the collection zone and diverting their flow upwardly to be received through the collection opening.

In some embodiments of the appliance, the external outline of the appliance is designed to conform with a shape of a container for allowing placement thereof for receiving the oily substance discharged from the collection opening.

In some embodiments, the appliance further includes a top cover that is configured to be switched between an open-accessible state, in which the one or more feeding ports, the capsule receptacle and/or the top face of the upper grinding member with the feeding opening are user-accessible, and a closed-covering state, in which the one or more feeding ports, the grinding members, the capsule receptacle and the capsule, when it is received in the capsule receptacle, are covered by the top cover.

In some embodiments, the appliance further includes a switch, such as a micro-switch, switchable between an active mode that allows the driving unit to operate and a non-active mode that prevents the operation of the driving unit. The top cover is configured for engaging with the switch when in a closed-covering state for switching it to an active state. When the top cover is in an open-accessible state, the switch is biased to a non-active state.

The present disclosure further discloses a capsule for containing produce that is intended to be fed into a grinding appliance such as disclosed above in an aspect of the present disclosure. The capsule is configured to be received in the appliance such that the content thereof flows easily towards a feeding opening of the appliance. In other words, when the capsule is received in the appliance, the surface on which the hard produce is contained within the capsule is slanted towards a channeling portion of the capsule that channels the produce towards the feeding opening.

Optionally, the capsule may be designed such that the external contour thereof is designed to have a portion that generally fits in its dimensions to accommodate a channeling portion of a different capsule to facilitate efficient storage of multiple capsules.

Thus, another aspect of the present disclosure provides a capsule for containing oil-containing hard produce. The capsule includes at least one compartment for containing the oil-containing hard produce. The at least one compartment includes a first surface, a channeling portion and a sealing.

The channeling portion extends from a portion of the first surface level, e.g. from a periphery portion of the first surface. The first surface (may be interchangeably referred to as first surface level) is a surface of the compartment on which the content of the capsule may lie, when the capsule is found in a suitable orientation, namely an orientation suitable for being received in a capsule receptacle. The channeling portion is configured for being received in a capsule receptacle, namely is designed or shaped to fit to be received in a capsule receptacle of a suitable appliance. The channeling portion is further configured for allowing the content of the capsule, e.g. hard produce, for passing therethrough to thereby flow into a feeding opening of the appliance.

The first surface is slanted towards the channeling portion for allowing produce thereon to flow, e.g. for gravitationally move, towards the channeling portion.

The sealing, e.g. a sealing foil, is formed within the channeling portion for blocking outflow of produce from the compartment prior to its use. The sealing is configured for being ruptured upon manipulation thereon, e.g. manipulation of the capsule that urges a blade towards the sealing foil and rupturing it.

In some embodiments of the capsule, the channeling portion is elongated. Typically, the elongation axis of the channeling portion is substantially normal to the first surface of the capsule. Substantially means that the angle is ±25° from right angle.

In some embodiments of the capsule, the channeling portion is extending from a peripheral portion of the first surface.

In some embodiments of the capsule, the first surface is confined by first peripheral walls and the channeling portion. The first peripheral walls are surrounding portions of the first surface, sections thereof may be external walls of the capsule that have faces facing the surrounding and other sections of the first peripheral walls may be internal walls, namely not being part of the external walls.

In some embodiments of the capsule, at least part of first surface is confined by first peripheral walls and a section of said first peripheral walls is upwardly extending towards a second surface level. The second surface level is slanted towards the first surface and/or towards the channeling portion. This is to allow flow of the produce while the capsule is received in the capsule receptacle. The term "upwardly" is relative and is not limiting to a certain orientation. In this configuration, the term "upwardly" refers to a direction that is generally opposite to the direction to which the channeling portion is extending to.

In some embodiments of the capsule, the second surface is formed between the section of first peripheral walls and second peripheral walls. The second peripheral walls are disposed along a section of the second surface.

In some embodiments of the capsule, the first and second peripheral walls constitute a part of the external walls of the capsule.

In some embodiments, the capsule includes a sealing closure element disposed on top portion, in some embodiments at the top end of the first and second peripheral walls, for sealing the produce content within the capsule, at least prior to its use.

In some embodiments of the capsule, the projections of the first and the second surfaces on a plane parallel to the first or the second surfaces do not overlap. Typically, the first and the second surfaces are parallel one to another.

In some embodiments of the capsule, a the contour of a portion the external surface is designed to conform with the geometry of the channeling portion. This allows a channeling portion of a different capsule to fit in said portion for increasing packaging efficiency of multiple capsules.

In some embodiments of the capsule, the section of the first peripheral walls and the second surface form together a depression in the external outline geometry of the capsule.

In some embodiments of the capsule, the depression conforms with the geometry of the channeling portion.

The appliance that described above with respect to an aspect of the present disclosure may be configured to receive any embodiment of the above described capsule.

An aspect of the present disclosure provides any of the above described embodiments of the appliance for use in a method for the extraction of oily substance from an oil-containing hard produce.

In some embodiments, the method includes (i) receiving the capsule of any one of the above described embodiments for introducing the hard produce into the grinding zone; (ii) rotating the first member for grinding the hard produce; and (iii) collecting the oily substance.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a perspective view of the appliance; FIG. 1B is a side view of the two grinding members; FIG. 1C is a top view of the bottom, second grinding member; FIG. 1D is a bottom view of the top, first grinding member; FIG. 1E is a perspective view of the appliance, omitting the grinding members.

FIG. 4A is a perspective view of the capsule; FIG. 4B is a top view of the capsule, showing the interior thereof; FIG. 4C is another perspective view of the capsule, showing the external part thereof; FIG. 4D is another perspective view of the capsule.

DETAILED DESCRIPTION OF EMBODIMENTS

The following figures are provided to exemplify embodiments and realization of the invention of the present disclosure.

Figure 1A:
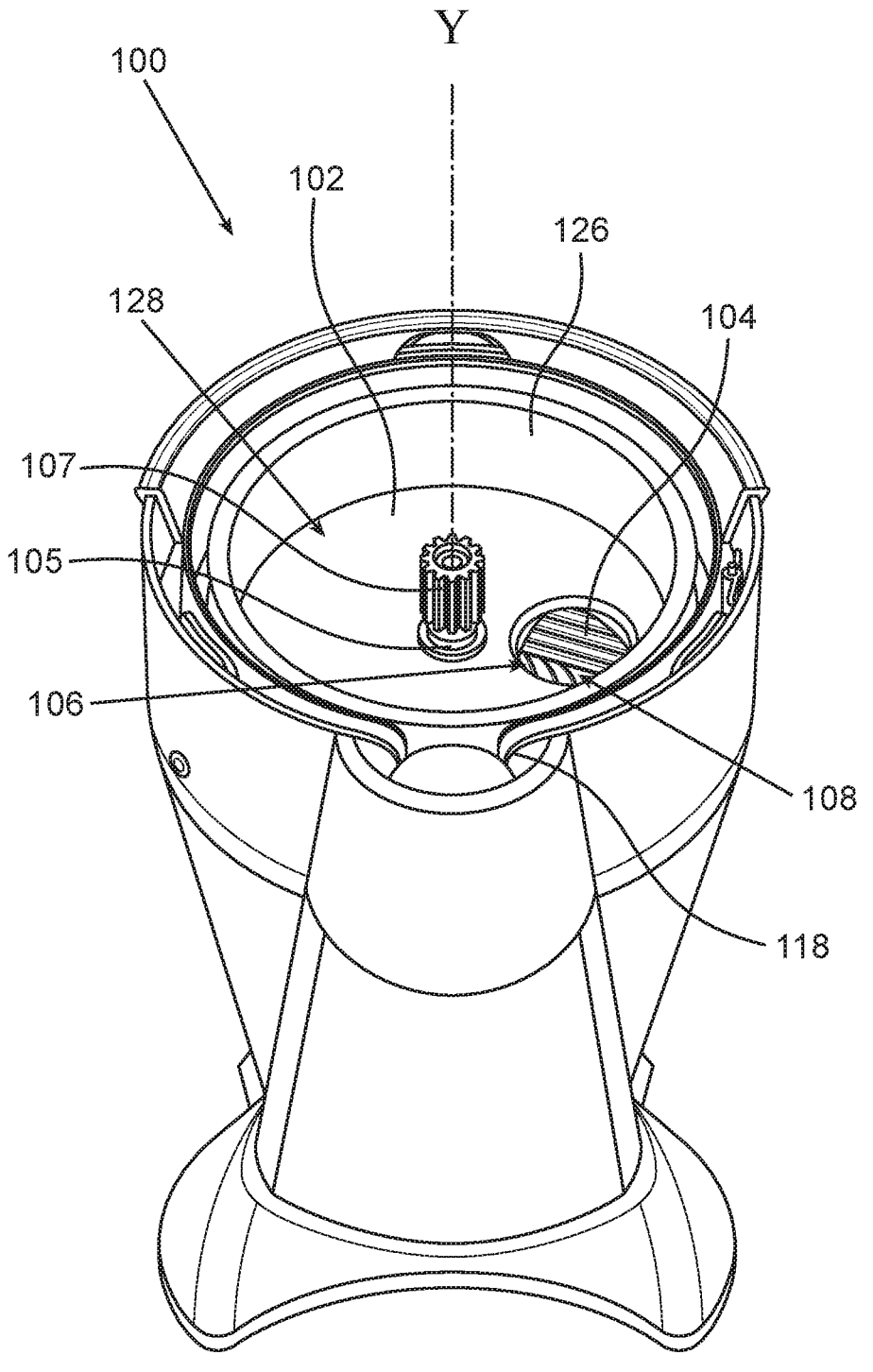
FIGS. 1A-1E are illustrations of different views of a non-limiting example of the appliance according to an aspect of the present disclosure, in which some of the figures omitting different components of the appliance.

FIGS. 1A-1D are illustrations of different views of a non-limiting example of the appliance according to an aspect of the present disclosure, in which some of the figures omitting different components of the appliance. FIG. 1A shows an appliance 100 that includes a first, top, grinding member 102 and a second, bottom, grinding member 104 coaxial with the first grinding member 102 about an axis Y defined by axle 105. The arrangement of the grinding members one on top of the other can be seen in FIG. 1B, which is a side-view of the two grinding members 102 and 104. The first grinding member 102 is formed with a feeding opening 106 to receive hard produce therethrough. The hard produce that is fed into the feeding opening 106 reaches a grinding zone 108 defined by grooved faces of the first and second grinding members 102 and 104 that face one another. The grinding zone includes inner and peripheral grinding zones as explained below. At least one of the grinding members is rotatable about the axis Y to carry out the grinding process of the produce that is fed into the feeding opening 106.

Figure 1B:
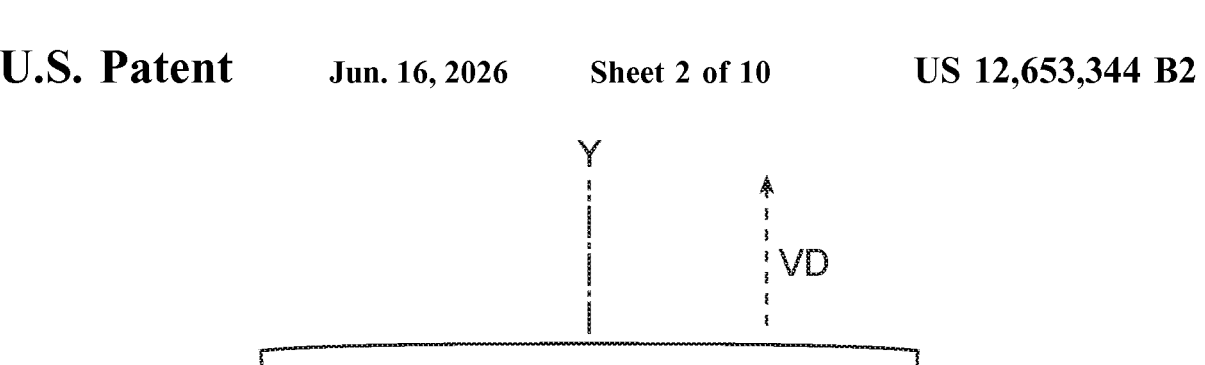
Figure 1C:
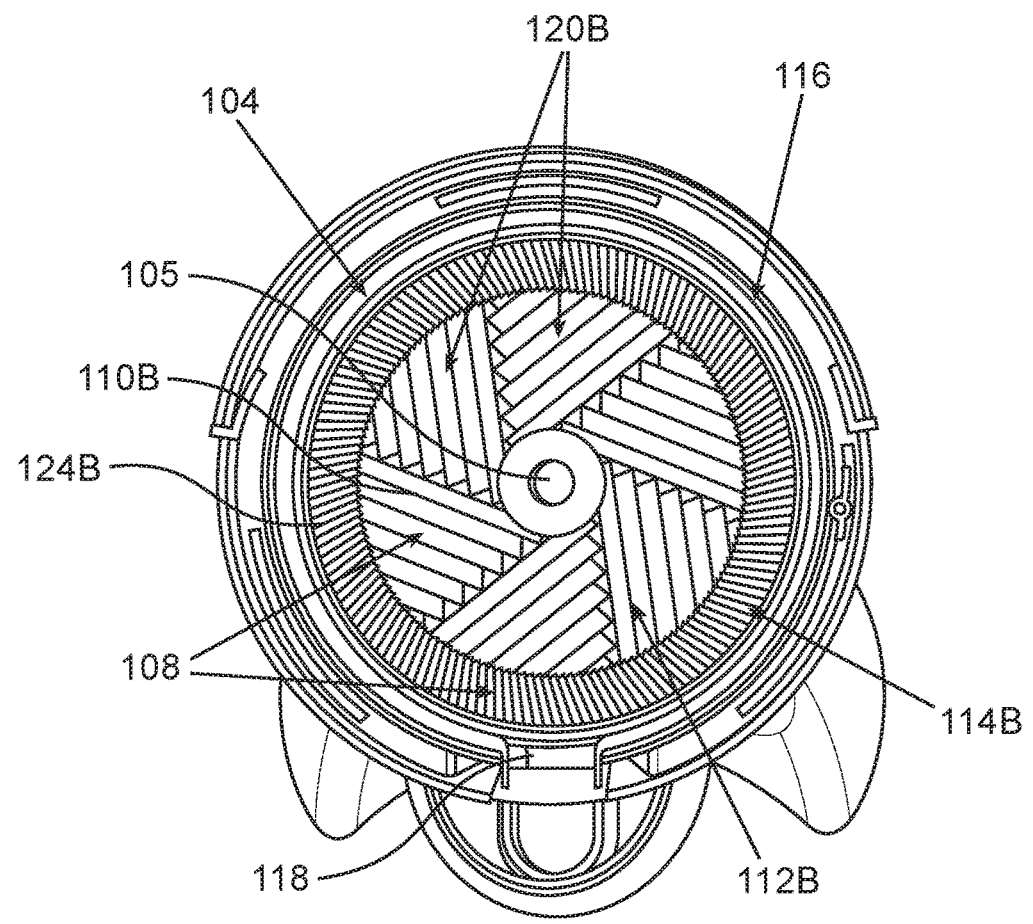

Reference is now made to FIG. 1C, in which the first grinding member is omitted with respect to FIG. 1A. As can be appreciated, the second grinding member 104 has a grooved face 110B that defines generally two different grinding zones, an inner grinding zone 112B that is defined between the axis Y and a peripheral grinding zone 114B, which is defined peripheral thereto. As can be seen best in FIG. 1D, which shows the first grinding member alone, the first grinding member 102 has a grooved face 110A that defines an inner grinding zone 112A and a peripheral grinding zone 114A that each matches the inner grinding zone 112B and the peripheral grinding zone 114B of the second grinding member 104. It can be appreciated that the feeding opening 106 is formed at the inner grinding zone 112A of the first grinding member 102. The two grinding members 102 and 104 define together a mutual inner and peripheral grinding zone.

As mentioned above, the hard produce is fed through the feeding opening 106 into the inner grinding zone to undergo primary grinding therein and be pushed to the periphery due to the rotation of one of the grinding members with respect to the other. The hard produce or the partially grinded oily-substance is urged/guided to the peripheral grinding zone to undergo further grinding therein and the grinded oily-substance product is urged to a peripheral collection zone 116 periphery of the peripheral grinding zone and flows there at a rotational manner to a substance collector 118 for collecting it. The substance collector 118 is may be in the form of an opening at a certain location along the collection zone 116 that practically allows the oily-substance product to be discharged so it can be collected in a container.

Figure 1D:
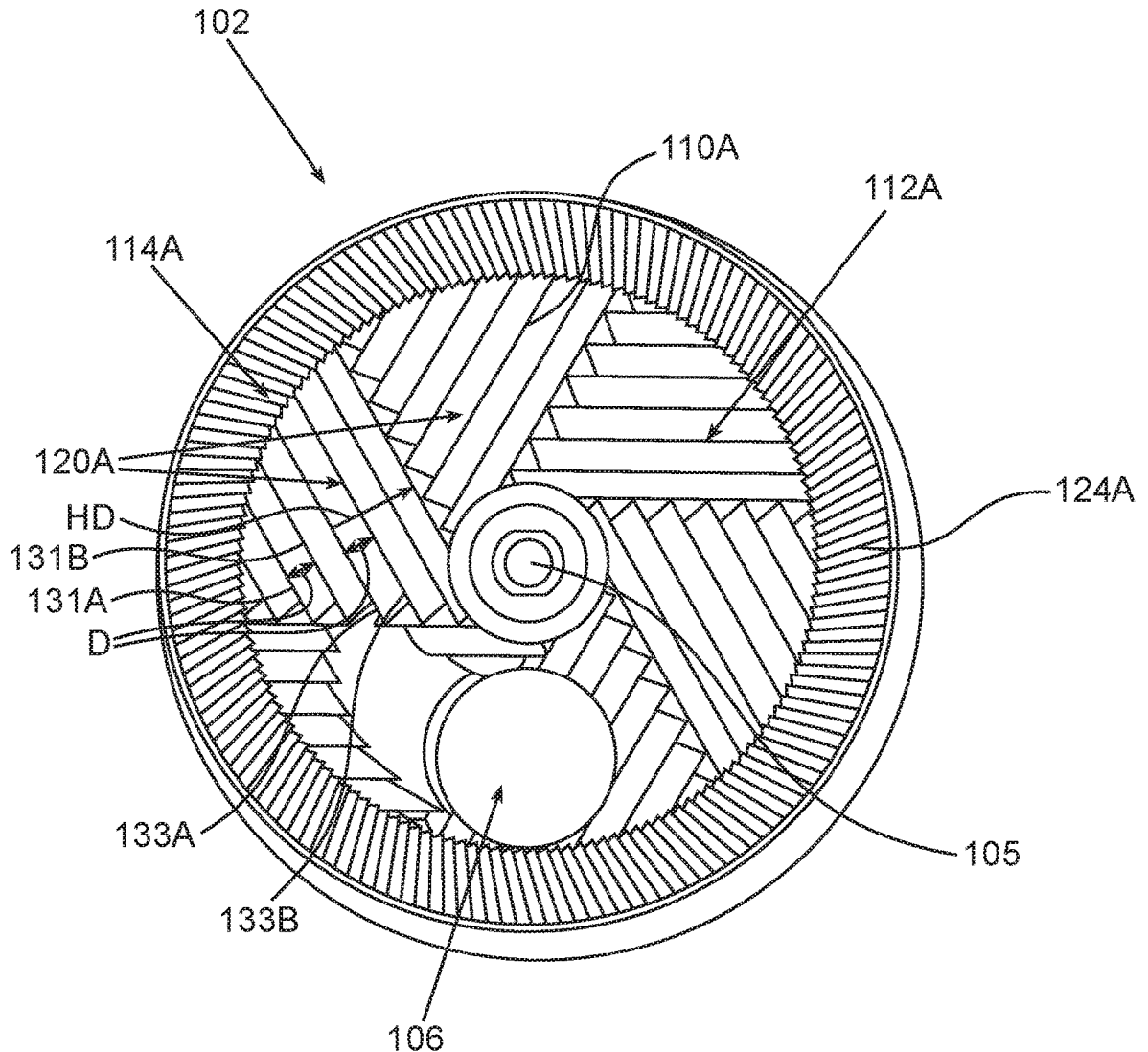

Reference is now made to FIGS. 1C and 1D, in which the grinding zones of the grinding members can be observed. The inner grinding zones 112A and 112B are formed of a plurality of respective inner grinding zone sections 120A and 120B, each section is patterned with a plurality of generally parallel grooves 122 having different lengths. The lengths of the grooves typically gradually decreasing with the distance from the axle 105. Namely, the grooves that a portion thereof is closer to the axle 105 than other grooves are typically longer.

While each section of the inner grinding zones 112A and 112B has a different grooves orientation (although, there may be two or more sections with a similar orientation), the peripheral grinding zones 114A and 114B have grooves 124A and 124B that have a generally radial orientation with respect to the rotation axis Y.

The grooves of the peripheral grinding zones 114A and 114B are denser than the grooves of the inner grinding zones 112A and 112B, namely the separation between each two adjacent grooves of the peripheral zones is smaller than the separation between each two adjacent grooves in each section of the inner grinding zones.

The grooves and/or the separations between the grooves of each of the grinding zones are typically having a rounded or smooth shape with no sharp edges so as to avoid undesired accumulation of substance and to allow relatively easy cleaning of the grinding members at the end of the grinding process. In particular, the fillet portion of the top portions of each groove is relatively large, at times the fillet is in the magnitude of the distance between the lowest portion of each groove and its top portion or greater than this magnitude, e.g. 1.5 folds greater, 2 folds or more. The grooves of any of the grooved portions are characterized by a periodical pattern of peaks and lows. For example, the grooves of a grooved section 120A of the inner grinding zone 112A has a periodical pattern along a horizontal direction HD. The horizontal distance D between each two adjacent peaks 131A and 131B or between each two adjacent lows 133A and 133B is constant in this example, however it is to be noted that in general this distance may vary along the horizontal direction HD. The horizontal distance D is greater than the vertical distance (not shown) between adjacent peak and low along the vertical direction VD (as can be seen in FIG. 1B).

The grinding members 102 and 104 are removable from the axle 105 to allow their cleaning or other maintenance actions. When the appliance is in operation, the axle 105 has a stopper element 107 at its top portion to prevent the movement of the grinding members along the axle. The axle 105 is connected to the first grinding member 102 and to a driving unit (not shown as it is hidden within the plastic cover) that is configured to rotate the axle 105 and therefore resulting in the rotation of the first grinding member 102 with respect to the second grinding member 104 to carry out the grinding process.

The first grinding member 102 is formed with peripheral walls 126 upwardly rising from a non-grooved, top face thereof. The peripheral walls 126 define a container volume 128 therebetween in which hard produce can be contained and gradually fed into the feeding opening 106 during operation of the appliance, namely during the rotation of the first grinding member 102.

Figure 1E:
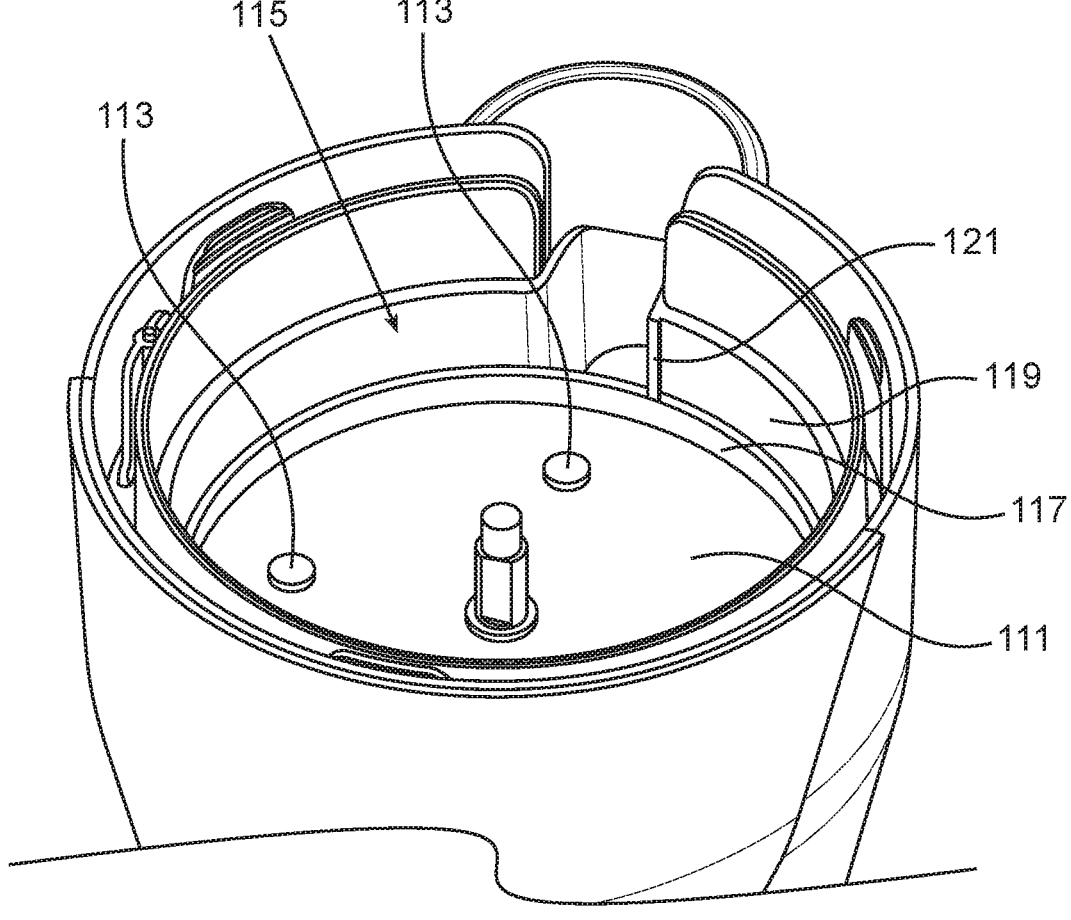

Reference is now made to FIG. 1E, in which a base body 111 can be observed, the base body 111 is typically made of one piece. The base body 111 includes abutments or protrusions 113 that are configured to fit into depressions formed at the bottom face of the bottom grinding member 104 (not shown). When the abutments are received in the respective depressions, the bottom grinding member 104 is secured to the base body 111. The base body 111 further includes a peripheral wall 115 having at least two different diameters. The first diameter portion 117 is defined at its bottom portion. The bottom portion is defined by the dimension of the bottom grinding member 104 such that the collection zone 116 is defined between the peripheral grinding zone and the peripheral wall. The second diameter portion 119 is defined above the first diameter portion 117 and has a larger diameter than the first diameter portion 117.

A diverting element 121 is formed along the flow path of the collection zone 116 at the proximity of the substance collector 118 to divert the ground oily substance from the collection zone towards the substance collector 118. The diverting element protrudes from the second diameter portion 119 of the peripheral wall 115.

In the figures throughout the application, like elements of different figures were given similar reference numerals shifted by the number of hundreds corresponding to the number of the respective figure. For example, element 204 in FIG. 2 serves the same function as element 104 in FIGS. 1A-1D.

Figure 2A:
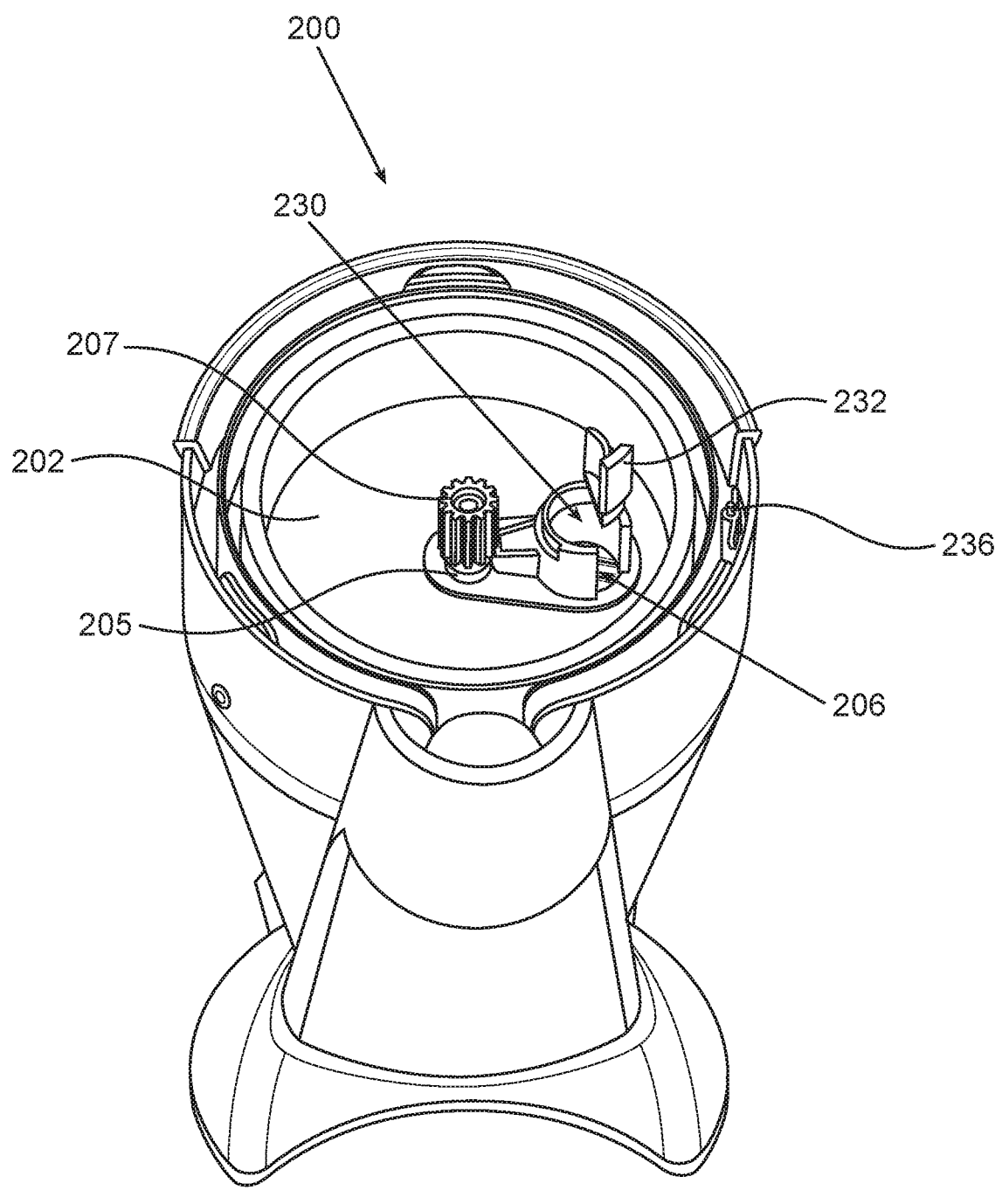
FIGS. 2A-2B are illustrations of perspective views of another non-limiting embodiment of the appliance of the present disclosure, wherein some components of the appliance are omitted or added in each figure.
Figure 2B:
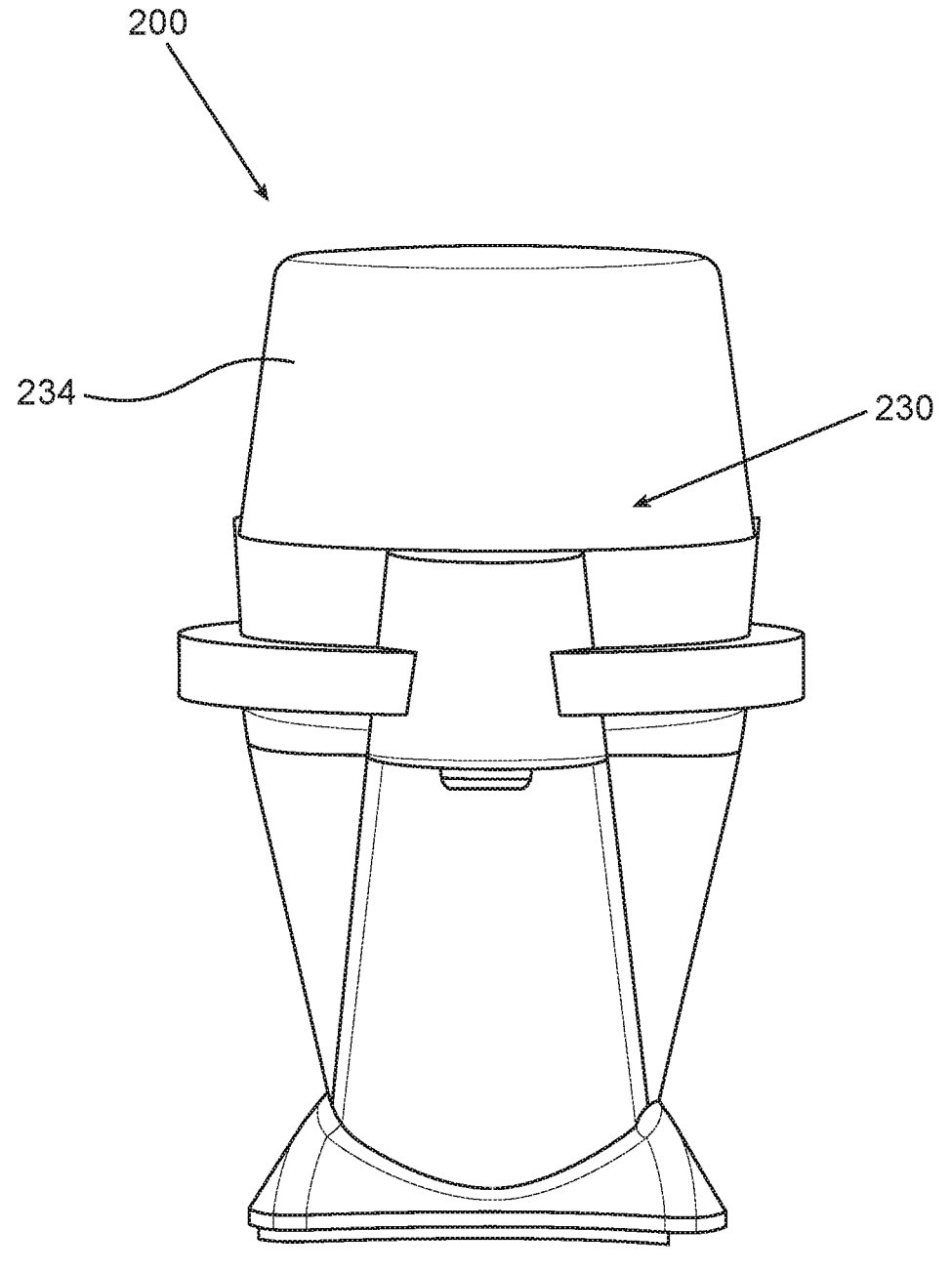

Reference is now made to FIGS. 2A-2B, which are illustrations of perspective views of another non-limiting embodiment of the appliance of the present disclosure. This embodiment differs from the embodiment of FIGS. 1A-1D by further including a capsule receptacle 230 that is configured to receive a capsule containing the hard produce and allow the feeding of the hard produce from the capsule into the feeding opening 206. The capsule receptacle 230 fits over the feeding opening 206 and includes a rupturing mechanism 232 that is configured to rupture a sealing of the capsule upon manipulation of the capsule in the capsule receptacle, such as placing it in the capsule receptacle and rotating it at a certain degree. The manipulation may be manually, namely by the user or automatically, namely by the appliance upon activation thereof.

The capsule receptacle 230 is rotatable together with the first grinding member 202. In this example, in addition to be fitted over the feeding opening 206, e.g. by designated attaching arrangement (not shown), the capsule receptacle is linked and secured to the axle 205 and also retained in position along the axle due to the stopper element 207.

The appliance of FIGS. 2A-2B further differs from that of FIGS. 1A-1D by including a top cover 234, as can be seen in FIG. 2B, that is switchable between an open state and a closed state. When the top cover 234 is in an open state a capsule can be received in the capsule receptacle 230. When the top cover 234 is in a closed state, if there is a capsule that is received in the capsule receptacle 230, it is confined by the top cover 234.

The appliance further includes a switching mechanism 236 that is configured to allow the operation of the driving unit only when the top cover 234 is in a closed state in particular for safety measures. By this configuration, the driving unit cannot operate when the top cover 234 is opened and therefore the first grinding member cannot rotate, ensuring that the user cannot contact the rotating components during operation of the appliance.

Figure 3A:
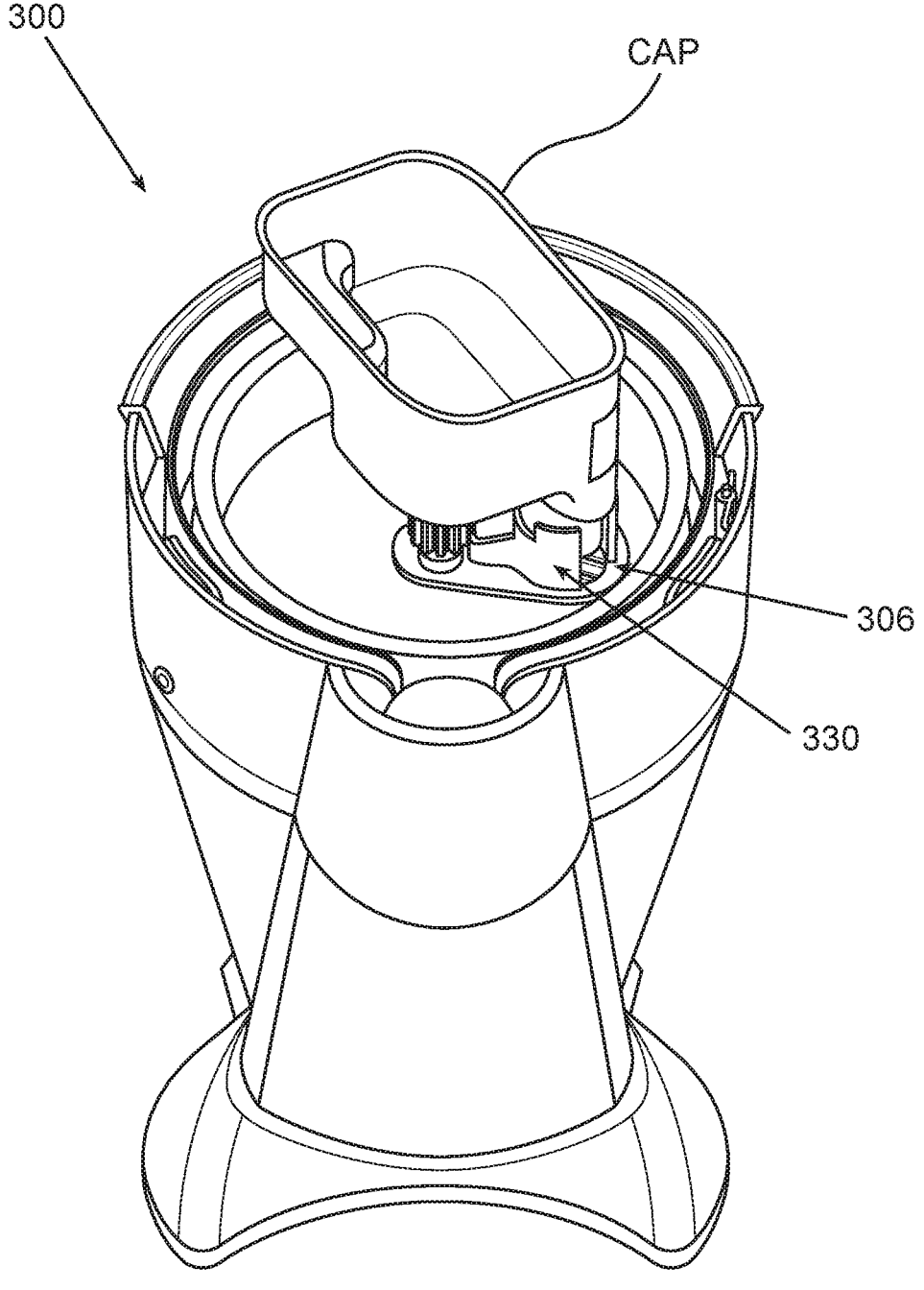
FIGS. 3A-3B are illustrations of perspective views of another non-limiting embodiment of the appliance of the present disclosure, wherein some components of the appliance are omitted or added in each figure.
Figure 3B:
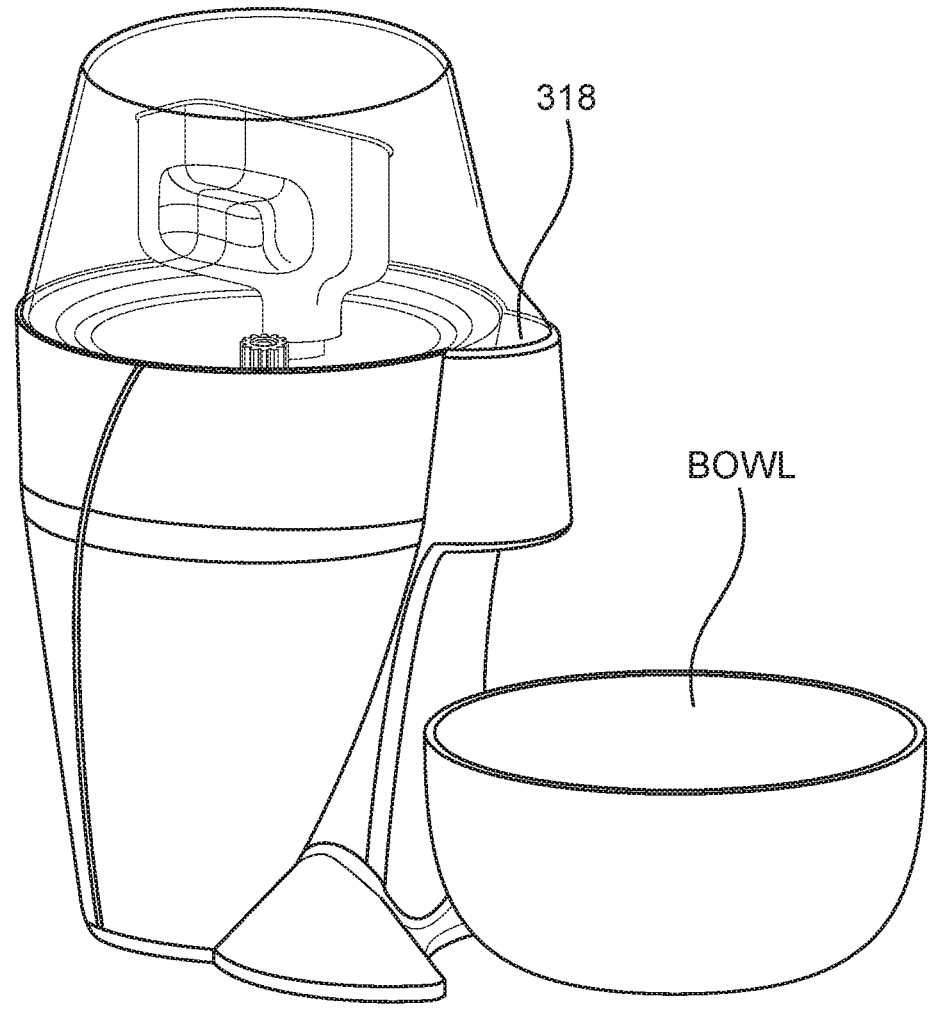
Figure 4A:
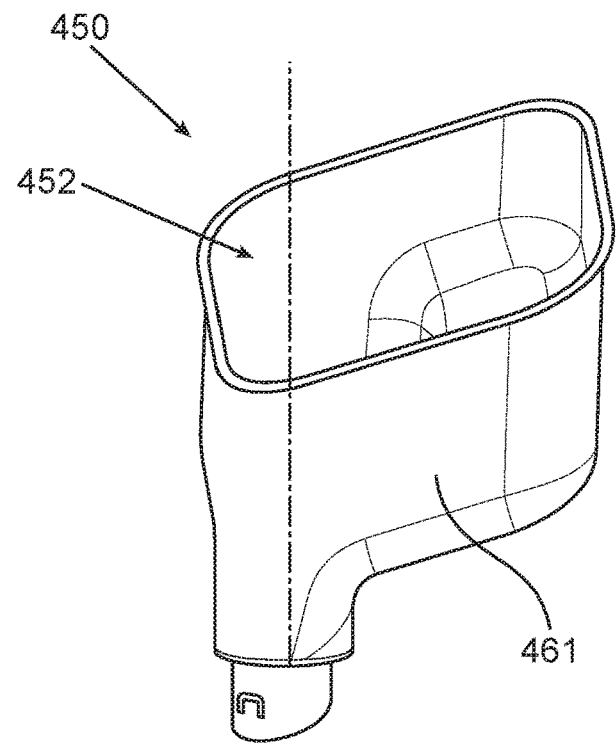
FIGS. 4A-4D are illustrations of different views of a non-limiting example of the capsule according to an aspect of the present disclosure.
Figure 4B:
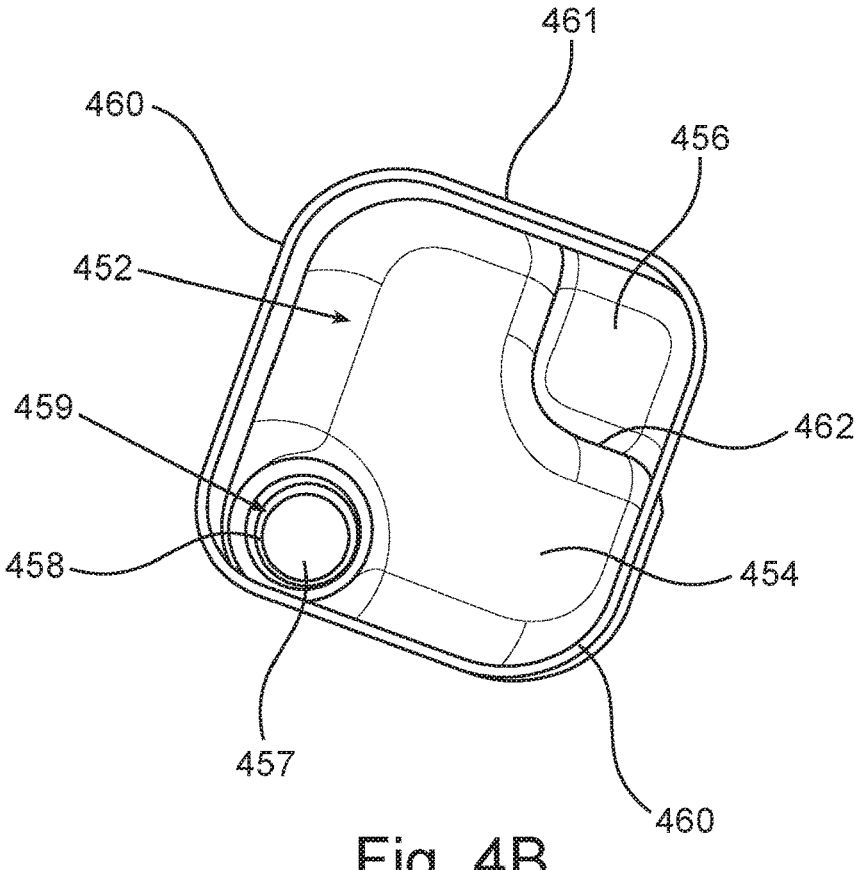
Figure 4C:
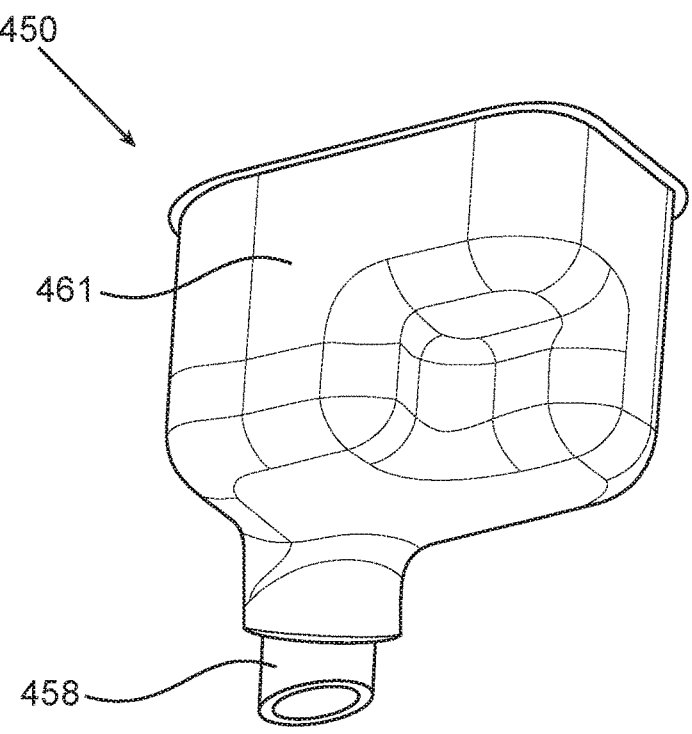
Figure 4D:
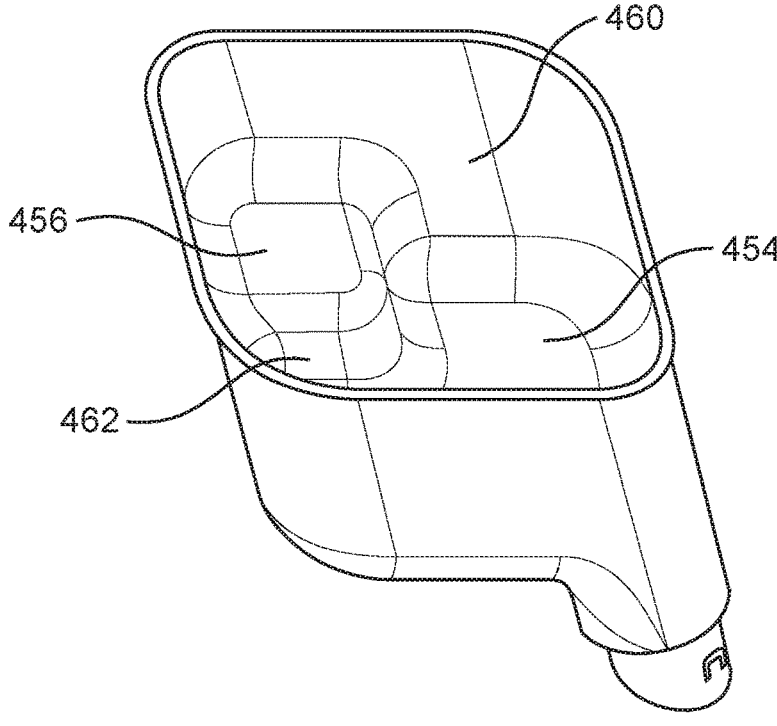

FIGS. 3A-3B are illustrations showing an example of the appliance exemplified in FIG. 2 with a capsule that is received within the capsule receptacle and a bowl for receiving the grinded substance from the substance collector. The capsule CAP is received in the capsule receptacle 330 such that the opening thereof, which is formed at the most bottom portion of the capsule CAP at the end of a channeling portion therein, is fitted over the feeding opening 306. The bowl BOWL is placed under the substance collector 318 for receiving the grinded substance that flows through the substance collector 318.

FIGS. 4A-4D are illustrations of different views of a non-limiting example of the capsule according to an aspect of the present disclosure. The capsule 450 includes one compartment 452 for receiving oil-containing hard produce therein (not shown). The compartment includes two different surface levels (or simply "levels"), a first level 454 and a second level 456, elevated with respect to the first level 454. A channeling portion 458 links the first level 454 with an opening 459 that is sealed with a sealing foil 457, for preventing outflow of the hard produce from the capsule 450 prior to use thereof. The channeling portion 458 is designed to be received by a capsule receptacle of a grinding appliance suitable to receive such capsule for grinding the hard produce.

The first surface level 454 is confined by the channeling portion 458 and first peripheral walls 460. Some sections of the first peripheral walls constitute a section of the external walls 461 of the capsule 450, and a wall linking section 462 of the first peripheral walls 460 links to the second surface level 456, namely the top end of said section constitutes a portion of the second surface level 456. The second surface level 456 is confined by the top portion of the linking section 462 and second peripheral walls that constitute a section of the external walls 461 of the capsule 450.

The first and second surface levels 454 and 456 are slanted towards the channeling portion 458 to allow hard produce to flow towards the channeling portion 458 and the opening 459 despite the rotational forces during the rotation of the capsule when it is received in an operated appliance.

The external contour of the capsule 450 is characterized by a depression 464 formed by the shape of the linking section 462 of the first peripheral walls 460 and the second surface level 456. The depression 462 is shaped to conform with the shape of the channeling portion 458 to allow efficient storage of the capsule, wherein the channeling portion of one capsule is received in the depression 462 of a second capsule.

The invention claimed is:

1. An appliance for grinding oil-containing hard produce to extract an oily substance therefrom, comprising:

first and second coaxial circular grinding members defining a grinding zone therebetween, the first coaxial circular member being rotatable about an axis with respect to the second coaxial circular member and is coupled to a driving unit for performing said rotation, each of the first and second coaxial circular members having respective first and second grooved faces facing the other on two sides of said grinding zone, each of the grooved faces having an inner grooved portion and a peripheral grooved portion, defining, respectively, inner and peripheral grinding zones, wherein grooves on the inner grooved portion being configured to urge the oil-containing hard produce towards the peripheral grooved portion, grooves of the peripheral grooved portion having a different pattern than the grooves of the inner grooved portion;

one of the first and second coaxial circular grinding members is formed with one or more feeding openings for feeding the oil-containing hard produce into the inner grinding zone; and a collection zone peripheral to the peripheral grinding zone for collecting the oily substance and channeling the oily substance to a substance collector, wherein the collection zone comprises a collection opening for allowing the extracted oily substance to be discharged through the substance collector, and wherein the collection zone is formed with flow diverting elements for directing the flow of the oily substance in the collection zone to the collection opening.

2. The appliance of claim 1, further comprising a peripheral wall that is peripheral to the peripheral grinding zone, wherein the collection zone is defined between the peripheral grinding zone and the peripheral wall; and wherein the peripheral wall is circular and has a varying diameter along the axis direction between first and second diameters, the first diameter is selected to define a space from one of the grinding members to form the collecting zone, and the second diameter is larger than the first diameter.

3. The appliance of claim 2, further comprising a base body configured to receive and retain a bottom grinding member of the first and second coaxial circular grinding members; and wherein the base body comprises the peripheral wall.

4. The appliance of claim 1, wherein each of the inner grooved portions of first and second members is formed of a plurality of inner grooved sections, each inner grooved section comprises parallel grooves having varying lengths;

wherein the grooves of the peripheral grooved portion are denser than the grooves of the inner grooved portion; and wherein the grooves of the inner grooved portion or the grooves of the peripheral grooved portion having generally rounded outline.

5. The appliance of claim 1, wherein each of the first and second grinding members is removable and separable from the axis; and wherein gap space between the two grinding members varies along a radial direction.

6. The appliance of claim 1, further comprising:

an axle formed along the axis and coupled to a driving motor for being rotated thereby, the first grinding member is coupled to the axle for being rotated thereby; and a screwing stopper element removably coupled to the axle for retaining the first grinding member on the axle upon being coupled to the axle and for allowing the removal of the first grinding member, upon removal of the screwing stopper element.

7. The appliance of claim 1, wherein the one or more feeding openings are formed at a selected radial distance from said axis; and wherein the radial distance is closer to the periphery of the first or second coaxial circular grinding members than to the axis.

8. The appliance of claim 1, further comprising a capsule receptacle configured for receiving a capsule containing said oil-containing produce such that the content of the capsule is allowed to be fed into at least one of said one or more feeding openings.

9. The appliance of claim 8, wherein the capsule receptacle is configured for rupturing a sealing foil of the capsule upon manipulating the capsule when the capsule is received in the capsule receptacle, for allowing the content of the capsule to flow through the one or more feeding openings.

10. The appliance of claim 8, wherein the capsule receptacle comprises a rupturing element for rupturing a sealing foil of the capsule for allowing the content of the capsule to flow through the one or more feeding openings.

11. The appliance of claim 8, wherein the capsule receptacle is rotatable around said axis together with the first grinding member; and wherein the capsule receptacle is coupled to an axle formed along said axis, said axle is coupled to a driving motor for being rotated thereby, the first grinding member is coupled to said axle for being rotated thereby.

12. The appliance of claim 11, further comprising a screwing stopper element for retaining the capsule receptacle and the grinding member on the axle, wherein the capsule receptacle extends along at least one of the one or more feeding openings.

13. The appliance of claim 8, wherein the capsule receptacle comprises an activation unit configured for allowing the rotation of the first member upon manipulation thereon; wherein said activation unit is switchable between active mode that allows the rotation of the first member and non-active mode that blocks the rotation of the first member, the activation unit is configured to be switched between non-active mode to active mode upon manipulation thereon.

14. The appliance of claim 1, further comprising an activation unit configured for allowing the rotation of the first member upon manipulation thereon.

15. The appliance of claim 1, wherein the grinding member formed with the one or more feeding openings is formed with peripheral upwardly rising walls from a face other than the grooved face, thereby forming a container volume.

16. The appliance of claim 1, comprising:
a top cover configured to be switched between an open-accessible state, in which said one or more feeding openings are user-accessible, and a closed-covering state, in which said one or more feeding openings are covered thereby; and
a switch switchable between an active mode that allows the driving unit to operate and a non-active mode that prevents the operation of the driving unit, wherein said top cover is configured for engaging with said switch upon being in a closed-covering state for switching said switch to an active state.

17. An appliance for grinding oil-containing hard produce to extract an oily substance therefrom, comprising:
first and second coaxial circular grinding members defining a grinding zone therebetween, the first member being rotatable about an axis with respect to the second member and is coupled to a driving unit for performing said rotation, each of the first and second members having respective first and second grooved faces facing the other on two sides of said zone, each of the grooved faces having an inner grooved portion and a peripheral grooved portion, defining, respectively, inner and peripheral grinding zones, the grooves on the inner grooved portion being configured to urge the produce towards the peripheral grooved portion, the grooves of the peripheral grooved portion having a different pattern than the grooves of the inner grooved portion;
one of the first and second grinding members is formed with one or more feeding openings for feeding the produce into the inner grinding zone;
a collection zone peripheral to the peripheral grinding zone for collecting the oily substance and channeling the oily substance to a substance collector;
a peripheral wall that is peripheral to the peripheral grinding zone, wherein the collection zone is defined between the peripheral grinding zone and the peripheral wall, wherein the peripheral wall is circular and has a varying diameter along the axis direction between first and second diameters, the first diameter is selected to define a space from one of the grinding members to form the collecting zone, the second diameter is larger than the first diameter.

18. An appliance for grinding oil-containing hard produce to extract an oily substance therefrom, comprising:
first and second coaxial circular grinding members defining a grinding zone therebetween, the first member being rotatable about an axis with respect to the second member and is coupled to a driving unit for performing said rotation, each of the first and second members having respective first and second grooved faces facing the other on two sides of said zone, each of the grooved faces having an inner grooved portion and a peripheral grooved portion, defining, respectively, inner and peripheral grinding zones, the grooves on the inner grooved portion being configured to urge the produce towards the peripheral grooved portion, the grooves of the peripheral grooved portion having a different pattern than the grooves of the inner grooved portion;
one of the first and second grinding members is formed with one or more feeding openings for feeding the produce into the inner grinding zone;
a collection zone peripheral to the peripheral grinding zone for collecting the oily substance and channeling the oily substance to a substance collector;
wherein the one or more feeding opening is formed at a selected radial distance from said axis; and
wherein said radial distance is closer to the periphery of the first or second coaxial circular grinding members than to said axis.

19. An appliance for grinding oil-containing hard produce to extract an oily substance therefrom, comprising:
first and second coaxial circular grinding members defining a grinding zone therebetween, the first member being rotatable about an axis with respect to the second member and is coupled to a driving unit for performing said rotation, each of the first and second members having respective first and second grooved faces facing the other on two sides of said zone, each of the grooved faces having an inner grooved portion and a peripheral grooved portion, defining, respectively, inner and peripheral grinding zones, the grooves on the inner grooved portion being configured to urge the produce towards the peripheral grooved portion, the grooves of the peripheral grooved portion having a different pattern than the grooves of the inner grooved portion;
one of the first and second grinding members is formed with one or more feeding openings for feeding the produce into the inner grinding zone;
a collection zone peripheral to the peripheral grinding zone for collecting the oily substance and channeling the oily substance to a substance collector;
a capsule receptacle configured for receiving a capsule containing said oil-containing hard produce such that the content of the capsule is allowed to be fed into at least one of said one or more feeding openings;
wherein the capsule receptacle is rotatable around said axis together with the first grinding member;
wherein the capsule receptacle is coupled to an axle formed along said axis, said axle is coupled to a driving motor for being rotated thereby, the first grinding member is coupled to said axle for being rotated thereby.

20. An appliance for grinding oil-containing hard produce to extract an oily substance therefrom, comprising:
first and second coaxial circular grinding members defining a grinding zone therebetween, the first member being rotatable about an axis with respect to the second member and is coupled to a driving unit for performing said rotation, each of the first and second members having respective first and second grooved faces facing the other on two sides of said zone, each of the grooved faces having an inner grooved portion and a peripheral grooved portion, defining, respectively, inner and peripheral grinding zones, the grooves on the inner grooved portion being configured to urge the produce towards the peripheral grooved portion, the grooves of the peripheral grooved portion having a different pattern than the grooves of the inner grooved portion;

one of the first and second grinding members is formed with one or more feeding openings for feeding the produce into the inner grinding zone;

a collection zone peripheral to the peripheral grinding zone for collecting the oily substance and channeling the oily substance to a substance collector;

wherein the grinding member formed with said one or more feeding openings is formed with peripheral upwardly rising walls from a face other than the grooved face, thereby forming a container volume.

\* \* \* \* \*